United States Patent [19]
Murakami et al.

[11] Patent Number: 5,613,005
[45] Date of Patent: Mar. 18, 1997

[54] CIPHER COMMUNICATION METHOD AND DEVICE

[75] Inventors: Yasuyuki Murakami, Uji; Kazuhito Ito, Nagaokakyo, both of Japan

[73] Assignee: Murata Kikai Kabushiki Kaisha, Kyoto, Japan

[21] Appl. No.: 499,064

[22] Filed: Jul. 6, 1995

[30] Foreign Application Priority Data

Jul. 7, 1994 [JP] Japan .................................. 6-156307

[51] Int. Cl.⁶ .................................. H04L 9/28; H04L 9/00
[52] U.S. Cl. .................................. 380/28; 380/9; 380/18; 380/21; 380/44; 380/46; 380/48; 380/49
[58] Field of Search .................................. 380/9, 21, 28, 380/30, 48, 49, 18, 44, 46; 331/78; 364/717

[56] References Cited

U.S. PATENT DOCUMENTS

| | | | |
|---|---|---|---|
| 4,797,921 | 1/1989 | Shiraishi | 380/28 |
| 5,257,311 | 10/1993 | Naito et al. | 380/48 |
| 5,345,507 | 9/1994 | Herzberg et al. | 380/28 |

*Primary Examiner*—Bernarr E. Gregory
*Attorney, Agent, or Firm*—Loeb & Loeb LLP

[57] ABSTRACT

Self-synchronizing encryption/decoding circuits are provided with a plurality of irreducible polynomials. An irreducible polynomial to be used in encryption between sending and receiving stations is selected prior to cipher communication. On the sending side, the selected irreducible polynomial is used to encrypt communication information to be transmitted. On the receiving side, the selected irreducible polynomial is used to decrypt communication information that is received. Use of an irreducible polynomial as a key provides a simple structure which eliminates the effects of missing data and enables encryption and decoding with communication lines on which gaps readily occur in the data being communicated.

9 Claims, 8 Drawing Sheets

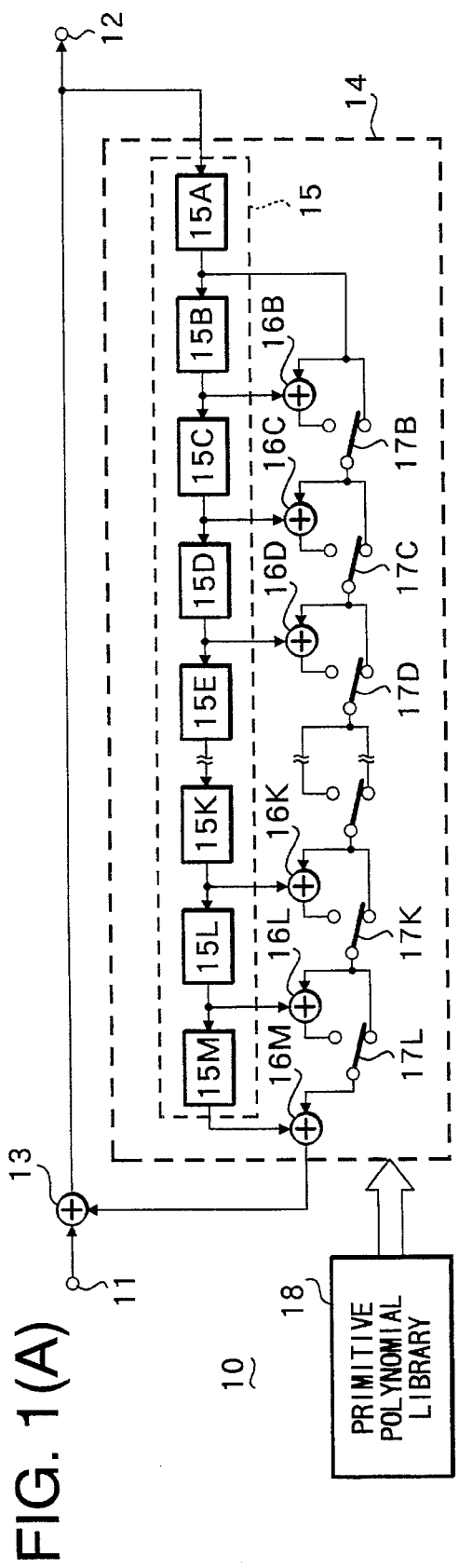
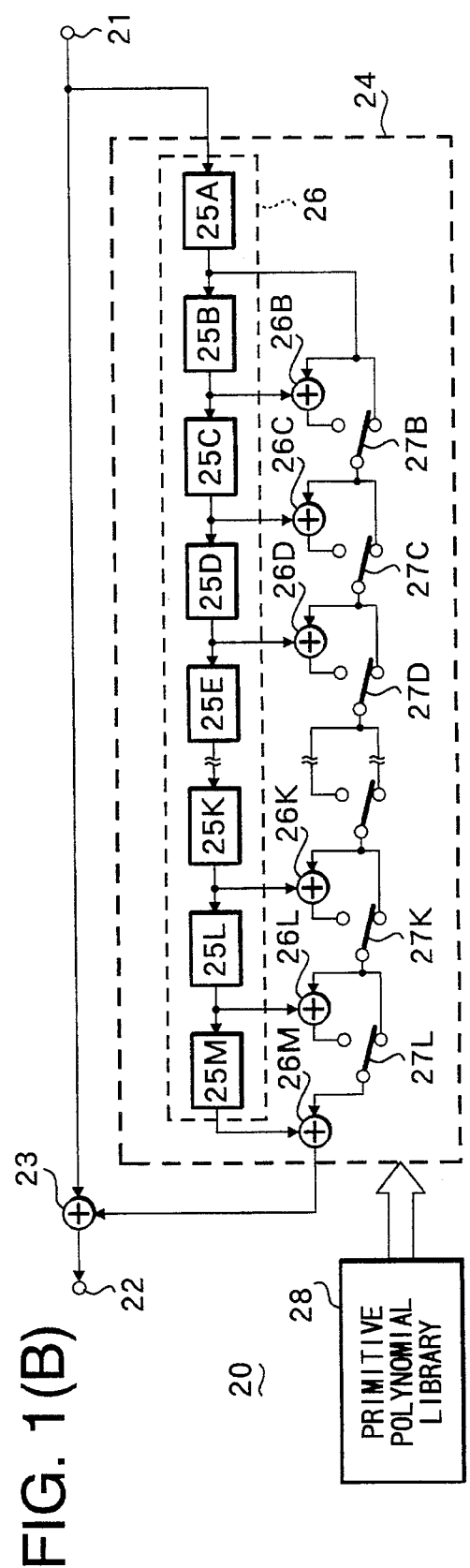
FIG. 1(A)
FIG. 1(B)

CIPHER COMMUNICATION METHOD AND DEVICE

BACKGROUND OF THE INVENTION

1. Technical Field

This invention relates to a cipher communication method and device suitable for digital data communication, and relates in particular to a cipher communication method and device that can be used even when there are gaps in the communication data on the transmission pathway.

2. Background Art

Communication information encryption is performed in digital data communication in order to protect communication from wire tapping. An example is shown in FIG. 8(A). Bit strings (open information) that have not yet been encrypted are input from a terminal 41, and encrypted bit strings (encrypted information) are output from a terminal 42. 45 is a 13-bit shift register in which the bit string that is to serve as the key for encryption is stored in advance. Every time a single bit of data is input to an adder 43 from the terminal 41, the bit string of the shift register 45 shifts one bit in the direction of the arrow 49, and the single bit of data is input to the adder 43.

The adder 43 calculates (exclusive-OR) the data input from the terminal 41 and the shift register 45, and outputs the result from the terminal 42 as encrypted information. The most significant bit 45M data of the shift register 45 is input to the adder 43, as well as to the least significant bit 45A and an adder 46 at a specified position of the shift register 45. The contents of the shift register 45 are the same for every $2^{12}-1$ shift cycle.

Decoding (decryption) is performed in the reverse order from encryption, as shown in FIG. 8(B). An encrypted bit string input from the terminal 51 is input along with the bit string of the shift register 55 to the adder 53. The calculation results of the adder 53 are output from the terminal 52 as decoded bit strings. The shift register 55 already contains the same bit strings (keys) as the shift register 45, and every time there is a shift the most significant bit 55M data of the shift register 55 is input to the adder 53, as well as to the least significant bit 55A and an adder 56 at a specified position of the shift register 55.

With the above method, however, when gaps occur in the bit strings on the transmission pathway during decoding, the bit strings of the shift register 56 are synchronized and shifted with the incomplete bit strings. Discrepancies occur in the encrypted bit strings following the occurrence of the gaps, and in the encryption keys (the bit strings of the shift register 56), and this renders decoding impossible. If a gap occurs in a bit string on the transmission pathway, the subsequent encrypted bit strings will not be able to be decoded.

There are various communication procedures for digital data communication which include error correction functions for correcting transmission errors on the transmission pathway, and error correction functions for detecting missing data and executing retransmission. In a communication procedure equipped with an error correction function that can restore missing data on the transmission pathway, an encryption method such as that described above can be used, but either more transmission time is required for retransmission, or more sophisticated encryption and decoding processing is required.

SUMMARY OF THE INVENTION

An object of the present invention is to provide a cipher communication method and device that enables encryption and decoding with a simple structure without the need for the retransmission of missing data, even when missing data occurs on the transmission pathway.

The cipher communication method of the present invention is characterized by the fact that the sending and receiving stations are equipped with a plurality of irreducible polynomials, and by the fact that at least one irreducible polynomial used in cipher communication is selected by the sending and receiving stations, the sending station encrypts the communication information in a self-synchronizing manner using the irreducible polynomial that has been selected, and then transmits it, and the receiving station decodes the communication information received in a self-synchronizing manner using the irreducible polynomial that has been selected.

The cipher communication device of the present invention comprising memory means for storing a plurality of irreducible polynomials, selection means for selecting at least one irreducible polynomial from among the irreducible polynomials stored by the memory means, at least one irreducible polynomial construction means for constructing the desired irreducible polynomial based on the selection means, and self-synchronizing encryption/decoding means for executing encryption and decoding using the irreducible polynomial that has been constructed by the irreducible polynomial construction means.

Self-synchronizing type of encryption/decoding means equipped with a plurality of irreducible polynomials is provided both to the sender and to the receiver. Prior to the communication of a bit string that is to be encrypted, at least one irreducible polynomial (hereafter called a "specific generating polynomial") used in encryption is selected from among the plurality of irreducible polynomials in transmission/reception, and a specific generating polynomial (key) is constructed in the encryption/decoding means.

After a specified generating polynomial has been constructed, the sender utilizes the specified generating polynomial to encrypt the bit string to be transmitted. The receiver utilizes the specified generating polynomial to decode the bit string that is received. Since a self-synchronizing type of encryption/decoding means is used, even when data gaps occur on the transmission pathway, the effect of the missing data can be eliminated subsequent to a specified bit. The use of a primitive polynomial for the irreducible polynomial, moreover, makes it possible to obtain a bit sequence with maximum randomness, and thus enables efficient encryption.

The present invention can be applied to digital wireless telephones for telephone communication, facsimile devices for executing image communication, and the like, regardless of the type of transmission pathway. The present invention, moreover, is not limited to voice and image data, but can also be used for other types of digital data communication.

Since irreducible polynomials are used in this way as encryption/decoding keys, it is possible to set encryption keys between two stations at the beginning of communication simply by selecting information indicating the irreducible polynomial to be used for encryption. Since a self-synchronizing encryption/decoding means is used, moreover, it is possible to eliminate the effects of missing data after specified bits even when gaps occur in bit strings on the transmission pathway.

BRIEF DESCRIPTION OF THE DRAWINGS

FIG. 1 (a) is a diagram depicting an encryption circuit which pertains to the cipher communication device of the present invention.

FIG. 1 (b) is a diagram depicting a decoding circuit which pertains to the cipher communication device of the present invention.

FIG. 8 (b) depicts a conventional decoding circuit.

DESCRIPTION OF THE PREFERRED EMBODIMENTS

Figure 2:
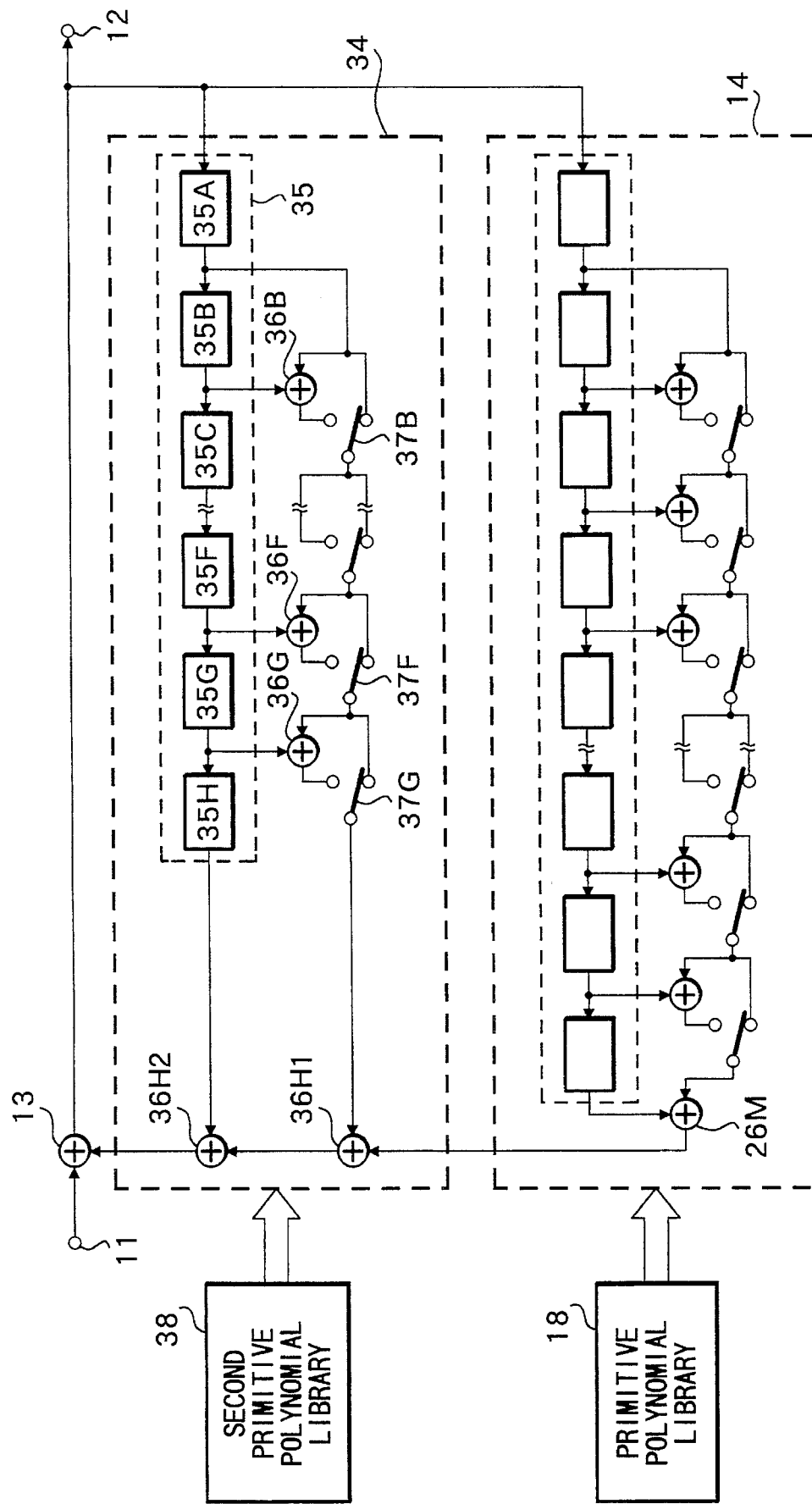
FIG. 2 shows a diagram depicting the essential components of the cipher communication device of the present invention.

FIG. 1(A) is a diagram depicting an encryption circuit 10 which pertains to the present invention. 11 is an input terminal, into which the open bit strings are input. 12 is an output terminal, from which the encrypted bit strings are output. 14 is a primitive polynomial constructor, and 13 is an adder for performing calculation (exclusive-OR); bit strings are input from the terminal 11 and the primitive polynomial constructor 14 to the adder 13. The output of the adder 13 is output from the terminal 12 as encrypted bit strings, and is also input to the primitive polynomial constructor 14.

The primitive polynomial constructor 14 will be described below. The primitive polynomial constructor 14 includes a 13-bit shift register 15 consisting of 15A to 15M, 12 adders 16B to 16M, and switches 17B to 17L provided to the adders 16B to 16L. The switches 17B to 17L are for rendering the adders 16B to 16L valid or invalid.

The present embodiment utilizes a generating polynomial with a degree of 12 and utilizes a primitive polynomial as the irreducible polynomial. The 12th-order generating polynomial, as shown in Table 1, holds 144 primitive polynomials. A primitive polynomial library 18 holds the primitive polynomial numbers shown in Table 1, as well as the primitive polynomial data thereof. The 1s and 0s of the primitive polynomial data depict, respectively, the presence and absence of items, and L through B depict the corresponding switches 17. The primitive polynomial constructor 14 can construct the desired primitive polynomials from the 144 primitive polynomials based on the primitive polynomial library 18.

TABLE 1

| Primitive Polynomial Number | Primitive Polynomial Library |||||||||||||
|---|---|---|---|---|---|---|---|---|---|---|---|---|---|
| | Primitive Polynomial Data |||||||||||||
| | $X^{12}$ | $+X^{11}$ | $+X^{10}$ (L | $+X^9$ K | $+X^8$ J | $+X^7$ I | $+X^6$ H | $+X^5$ G | $+X^4$ F | $+X^3$ E | $+X^2$ D | $+X^1$ C | $+1$ B) |
| 1 | 1 | 0 | 0 | 0 | 0 | 0 | 1 | 0 | 1 | 0 | 0 | 1 | 1 |
| 2 | 1 | 0 | 0 | 0 | 0 | 0 | 1 | 1 | 0 | 1 | 0 | 0 | 1 |
| 3 | 1 | 0 | 0 | 0 | 0 | 0 | 1 | 1 | 1 | 1 | 0 | 1 | 1 |
| 4 | 1 | 0 | 0 | 0 | 0 | 0 | 1 | 1 | 1 | 1 | 1 | 0 | 1 |
| 5 | 1 | 0 | 0 | 0 | 0 | 1 | 0 | 0 | 1 | 1 | 0 | 0 | 1 |
| | (Partially Omitted) |||||||||||||
| 142 | 1 | 1 | 1 | 1 | 1 | 1 | 0 | 1 | 1 | 1 | 0 | 1 | 1 |
| 143 | 1 | 1 | 1 | 1 | 1 | 1 | 0 | 1 | 1 | 1 | 1 | 0 | 1 |
| 144 | 1 | 1 | 1 | 1 | 1 | 1 | 1 | 0 | 0 | 1 | 0 | 0 | 1 |

For example, when the primitive polynomial $$X^{12}+X^6+X^4+X+1$$

of primitive polynomial number 1 in Table 1 is constructed, switches 17B, 17E, and 17G (17E and 17G are not shown in the drawings) from among switches 17B to 17L are connected to the adders 16B, 16E, and 16G (16E and 16G are not shown in the drawings), and the adders 16B, 16E, and 16G are rendered significant. In this manner, the switches 17B to 17L that correspond to items for which the primitive polynomial data is 1 are connected to the adders 17B to 17L, making it possible to construct the desired primitive polynomial.

The bit strings that are output from the adder 13 are output from the terminal 12 and are input to the least significant bit 15A of the shift register 15. As the bit strings that are input to the shift register 15 are shifted in sequence, calculation is performed with the specified bit, and input to the adder 13 is effected. This shift operation is executed in sync with the bit string input to the terminal 11. In short, encryption is effected by dividing the message polynomial which expresses the input bit strings in terms of descending order coefficients by the encryption generating polynomial (key).

FIG. 1(B), moreover, depicts a decoding circuit 20 for decoding cipher text. 21 is an input terminal, into which the encrypted bit strings are input. 22 is an output terminal, from which the decoded bit strings are output. 24 is a primitive polynomial constructor, and 23 is an adder for performing calculations (exclusive-OR).

The bit strings that have been input from the input terminal 21 are input to the adder 23 and the primitive polynomial constructor 24. The bit strings are input from the terminal 21 and the primitive polynomial constructor 24 to the adder 23. The output of the adder 23 is output from the terminal 22 as decoded bit strings.

The primitive polynomial constructor 24 is constructed, in the same manner as the primitive polynomial constructor 14, from a shift register 25 consisting of 25A to 25M, adders 26B to 26M, and switches 27B to 27L. The decoding circuit 20 includes, in the same manner as the encryption circuit 10, a primitive polynomial library 28 for storing the primitive polynomial data and the primitive polynomial numbers shown in Table 1, and can construct the desired primitive polynomial.

In the primitive polynomial constructor 24, the input of the bit strings from the terminal 21 synchronized with the shift of the shift register 25 is performed, followed by the calculation defined by the adders 26B to 26M and the switches 27B to 27L. The bit strings output from the primitive polynomial constructor 24 are input to the adder 23.

The utilization of the same primitive polynomial as used in the encryption circuit 10 at the decoding circuit 20 allows decoding the cipher text encrypted by the encryption circuit 10.

Agreement as to which primitive polynomial to use from among the plurality of primitive polynomials may be made between the transmitting and receiving sides by utilizing random numbers, calculations, or the like before communication of the bit strings that are to be communicated.

Since a 12-order primitive polynomial is utilized by the encryption circuit 10 and the decoding circuit 20, even when data gaps occur on the transmission pathway, the effect of these data gaps can be eliminated after 12 bits. The order may be greater than or less than 12. In general, the greater the degree, the greater the number of encryption keys. For example, a 13-order primitive polynomial has 630 polynomials, meaning that merely increasing the order by 1 can greatly increase the number of primitive polynomials (keys).

Although primitive polynomials make it possible to execute the most efficient decoding with the highest level of randomness, irreducible polynomials other than primitive polynomials can also be used as keys. When an irreducible polynomial other than a primitive polynomial is used, it is possible to greatly increase the number of keys without increasing the degree of the polynomial.

With this embodiment, moreover, although a register, adders, and switches are used for the hardware, the present invention can also be constructed using a microcomputer and software (program).

An encryption circuit 30 composed of a plurality of primitive polynomial constructors arranged in parallel will be described below with reference to FIG. 2. The same symbol is given to locations corresponding to those in the encryption circuit 10. 38 is a second primitive polynomial library, which, in the same manner as the primitive polynomial library 18, contains primitive polynomial numbers and primitive polynomial data. 34 is a second primitive polynomial constructor, which, in the same manner as the primitive polynomial constructor 14, contains a register 35, adders 36B to 36H, and switches 37B to 37G, and which makes it possible to construct the desired primitive polynomials based on the primitive polynomial data of the second primitive polynomial library 38.

The output of the adder 26M of the primitive polynomial constructor 14 and the output of the switch 37G of the second primitive polynomial constructor 34 are input to the adder 36H1. The output of the adder 36H1 and the output of the most significant bit 35H of the register 35 are input to the adder 36H2. The output of the adder 36H2 and the bit strings input from the input terminal 11 are input to the adder 13. The output of the adder 13 is output as encrypted bit strings from the output terminal 12 and input to the polynomial construction circuit 14 and the second polynomial construction circuit 34.

The order of the second primitive polynomial constructor 34 is 7; this may be larger or smaller than the order of the primitive polynomial constructor 14 (as long as the former is different from the latter). When the degrees of the two primitive polynomials utilized in encryption are designated m and n, respectively, they should be established so that $(2^m-1)$ and $(2^n-1)$ are relatively prime.

As with the encryption circuit 30, the arrangement in parallel of a plurality of polynomial constructors with different orders makes it possible, even when the orders of each of the primitive polynomials is small, to obtain essentially the same effect as when a primitive polynomial with a high order is used. Following the highest order bit of the plurality of polynomials, it is possible to eliminate the effects of missing data. For example, when 12-order and 7-order primitive polynomials are used, as with the encryption circuit 30, following the generation of the missing data, it is possible to eliminate the effects of the missing data after 12 bits. In short, it is possible to increase the number of encryption keys without increasing the number of bits required to eliminate the effects of the missing data.

To decode cipher text that has been encrypted using the encryption circuit 30, a plurality of primitive polynomial constructors may be provided to the decoding circuit 20, as with the encryption circuit 30; a detailed description is omitted.

Figure 3:
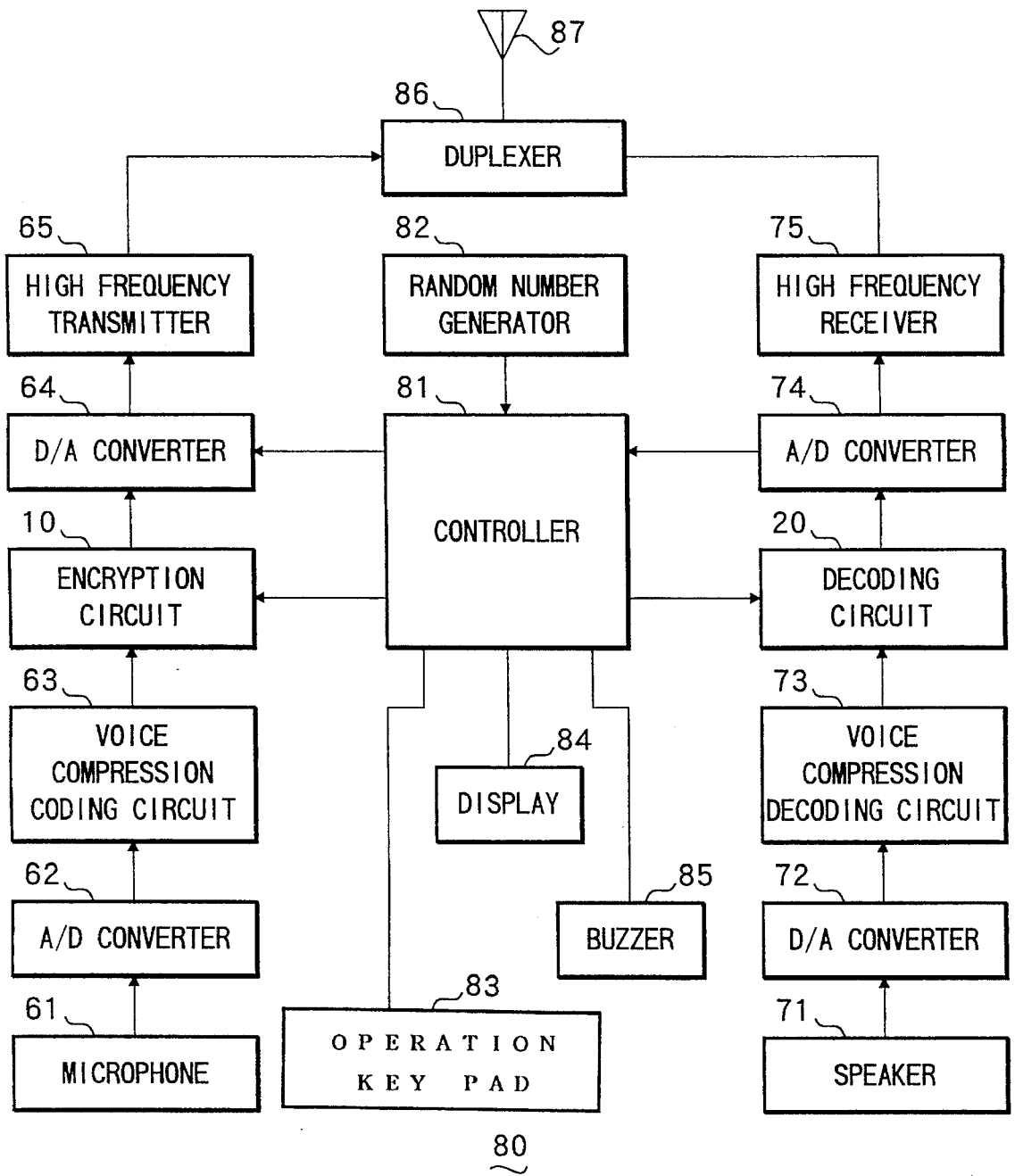
FIG. 3 shows a block diagram depicting the cipher telephone communication device of the present invention.

A digital wireless telephone 80 that utilizes the above encryption circuit 10 and decoding circuit 20 is described below with reference to FIG. 3.

61 is a microphone which outputs an analog voice signal to an A/D converter 62. The A/D converter 62 converts the analog voice signal into digital voice data, and outputs it to a voice compression coding circuit 63. The voice compression coding circuit 63 compresses the digital voice data and outputs it to the encryption circuit 10.

The encryption circuit 10 encrypts the compressed digital voice data based on the primitive polynomials, and outputs it to a D/A converter 64. Control data from a controller 81 is also output to the D/A converter 64. The controller 81 analyzes and generates the control data for executing, among other things, the allocation, connection, and opening of the communication line (frequency) with the communication partner station. The controller 81 is also equipped with a random number generator 82 for selecting the desired primitive polynomial (specific polynomial) from a plurality of primitive polynomials.

The D/A converter 64 converts the digital data into analog data to enable high frequency modulation, and outputs it to a high frequency transmitter 65. The high frequency transmitter 65 modulates the analog signal and outputs a high frequency from an antenna 87. 86 is a duplexer for antenna sharing in transmission and reception. 83 is an operation key pad, 84 is a display, and 85 is a buzzer.

A high frequency receiver 75 demodulates the high frequency signals received by the antenna 87, and outputs them to the A/D converter 74. The A/D converter 74 digitizes the demodulated analog signal, executes equalization processing and the like, and outputs the result to the decoding circuit 20 as bit strings. One part of the bit strings is output to the controller 81. The decoding circuit 20 decodes the cipher based on the primitive polynomials, and outputs the result to a voice compression decoding circuit 73.

The voice compression decoding circuit 73 decodes the digital voice data that has been subjected to compression encoding, and thereby restores the digital voice data and outputs it to the D/A converter 72. The D/A converter 72 converts the digital voice data into an analog voice signal and outputs it from a speaker 71.

Figure 4:
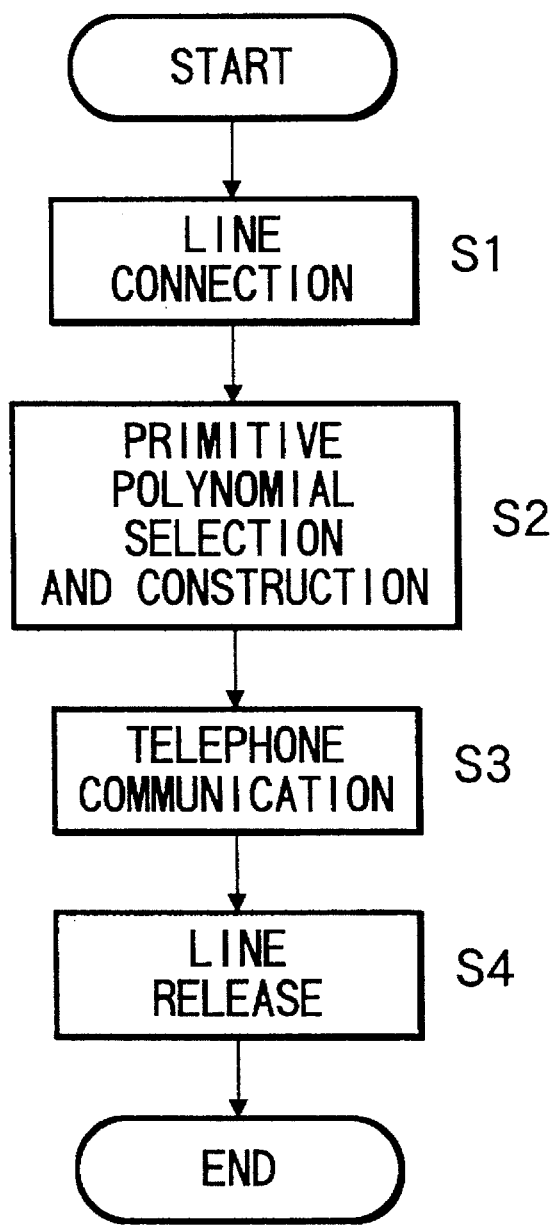
FIG. 4 shows a flow chart depicting the cipher telephone communication method of the present invention.

The communication procedure will be described below with reference to FIG. 4. The communication partner station may be the same as the digital wireless telephone 80 of this embodiment, or it may be the base station of a mobile communications system for the centralized management of a plurality of digital wireless telephones. When a specific operation is executed by the user using the operation key pad 83 of the digital wireless telephone 80, the partner station is called, and connection with telephone line is established (S1).

Next, a random number is generated by the random number generator 82, and a primitive polynomial number depicting the primitive polynomial used in encryption is selected based on this random number. The primitive polynomial number is also transmitted to the telephone communication partner station as a part of the control data. The encryption circuit 10 fetches the primitive polynomial data from the primitive polynomial library 18 based on the primitive polynomial number that has been selected, and operates the switches 17B to 17L to construct the primitive polynomial (S2). It is also possible to use a method other than a random number method in order to select the primitive polynomial.

When the construction of the primitive polynomial has been completed, telephone communication can be initiated (S3). The analog voice signal input from the microphone 61 is digitized, compression encoded, and encrypted, after which it is transmitted to the telephone communication partner station. When telephone communication is terminated, the (telephone) communication line is released, and communication is terminated (S4).

A case will be described below with FIG. 3 and FIG. 4 in which a digital wireless telephone 80 with the same structure as this embodiment is the called station. When the controller 81 detects a call from the host system, a the buzzer 85 sounds. When the user notices the buzzer and operates the specified key (not shown in the drawing) of the controller 83, the digital wireless telephone 80 responds to the incoming communication and establishes a telephone communication line (S1).

When the primitive polynomial number indicating the primitive polynomial used in encryption is subsequently received, the decoding circuit 20 fetches the primitive polynomial data from the primitive polynomial library 28 and operates the switches 27B to 27L to construct the primitive polynomial (S2). When telephone communication commences, the digital voice data that has been received by the high frequency receiver 75 and subjected to A/D conversion is decoded by the decoding circuit 20, after which it is subjected to compression decoding, converted into an analog signal, and output from a speaker 71 (S3). When telephone communication has been terminated, the communication line is released, and communication is terminated (S4).

With the digital wireless telephone 80 described above, to select the primitive polynomial used in encryption, the primitive polynomial number is selected by means of a random number at the calling side, and the primitive polynomial number is transmitted to the called side. The selection of the primitive polynomial can also be performed as follows.

(1) A primitive polynomial number is selected by random number by the digital wireless telephone on the called side, and is then transmitted to the calling side.

(2) The telephone numbers of the calling and called sides are exchanged at the time of circuit connection, and the telephone numbers of one or both, as well as a specified calculation formula, are used to select a primitive polynomial, construct a primitive polynomial, and execute cipher communication. When the calculation formula is secret, dual encryption is possible.

(3) When the coding circuit 30 is used, a plurality of primitive polynomials must be selected, and the method for selecting primitive polynomials described above can be combined with each other.

Figure 5:
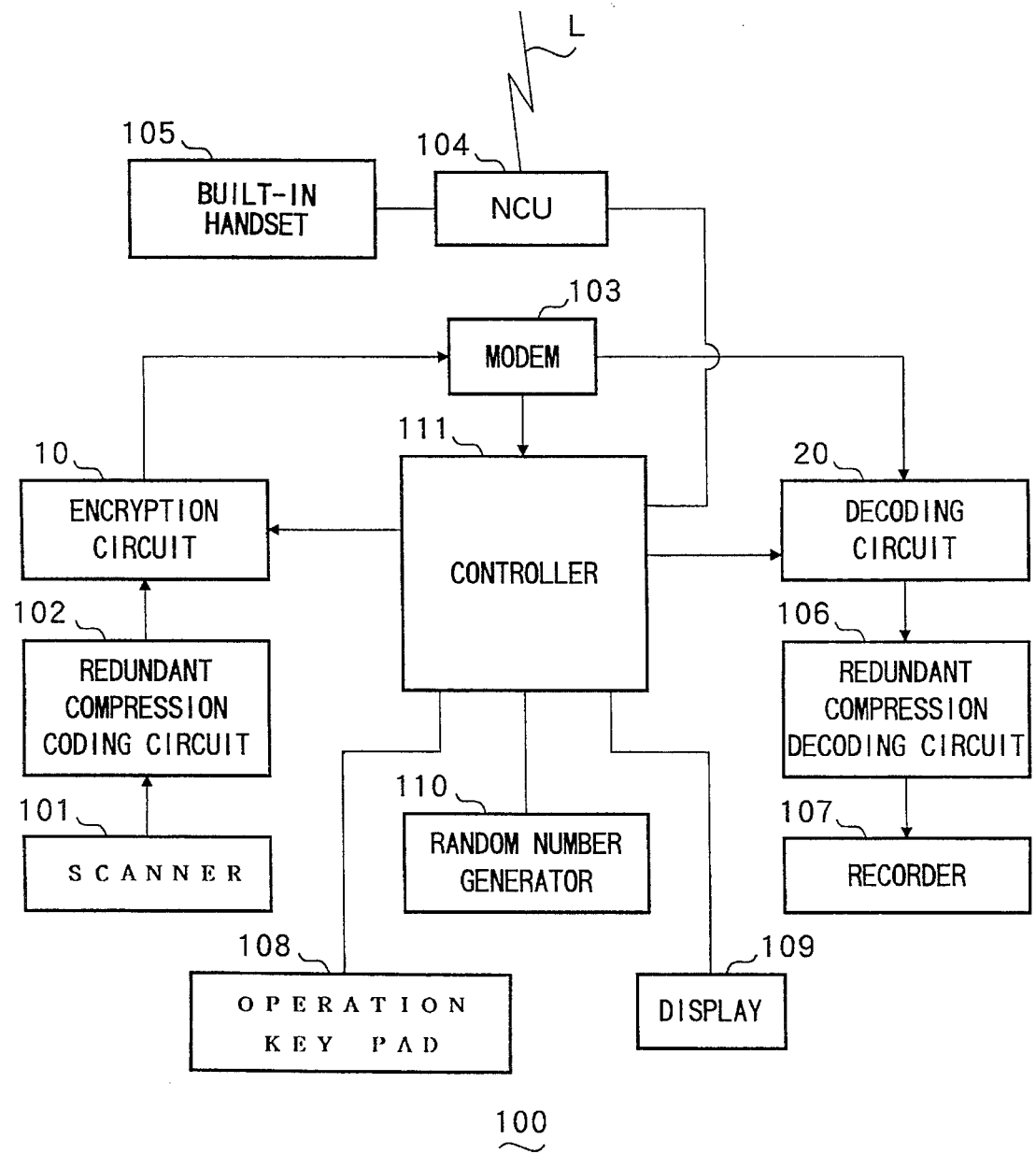
FIG. 5 illustrates a block diagram depicting the cipher facsimile communication device of the present invention.

A facsimile device 100 that utilizes the encryption circuit 10 and decoding circuit 20 described above will be described with reference to FIG. 5. A scanner 101 utilizes a CCD or other optical/electrical conversion element or a binary converter or the like to convert characters and graphics or other images to digital image data, which it then outputs to a redundant compression coding circuit 102. The redundant compression coding circuit 102 subjects the digital image data to redundant compression coding by means of MH or MR or the like, and the result is then output to the encryption circuit 10.

The encryption circuit 10 encrypts the image data that has been subjected to redundant compression coding, and outputs the result to a modem 103. The modem 103 modulates the digital data so that it can be transmitted by means of a telephone line L, and demodulates the analog signal received from the telephone line L, in addition to generating and detecting communication procedure signals. A line control unit (NCU) 104 executes connection and release between the telephone line L and the modem 103 or a built-in handset 105.

An analog signal that has been received from the communication partner facsimile device via the telephone line L is demodulated into digital data by the modem 103, and then input to the decoding circuit 20. The decoding circuit 20 decodes the encrypted digital data and outputs it to a redundant compression decoding circuit 106. The redundant compression decoding circuit 106 subjects the digital data whose encryption has been decoded to redundant compression decoding, and then outputs it to a recorder 107. The recorder 107 prints the digital image data out to recording paper via an electrophotographic recording method or the like.

108 is an operation key pad that is equipped, for example, with keys (not shown in the drawings) for operating the facsimile device 100, 109 is a display for displaying the operating state of the facsimile device 100, and 110 is a random number generator for generating random numbers for selecting the primitive polynomials used in encryption. 111 is a controller for controlling each of the above components of the facsimile device 100.

Figure 6:
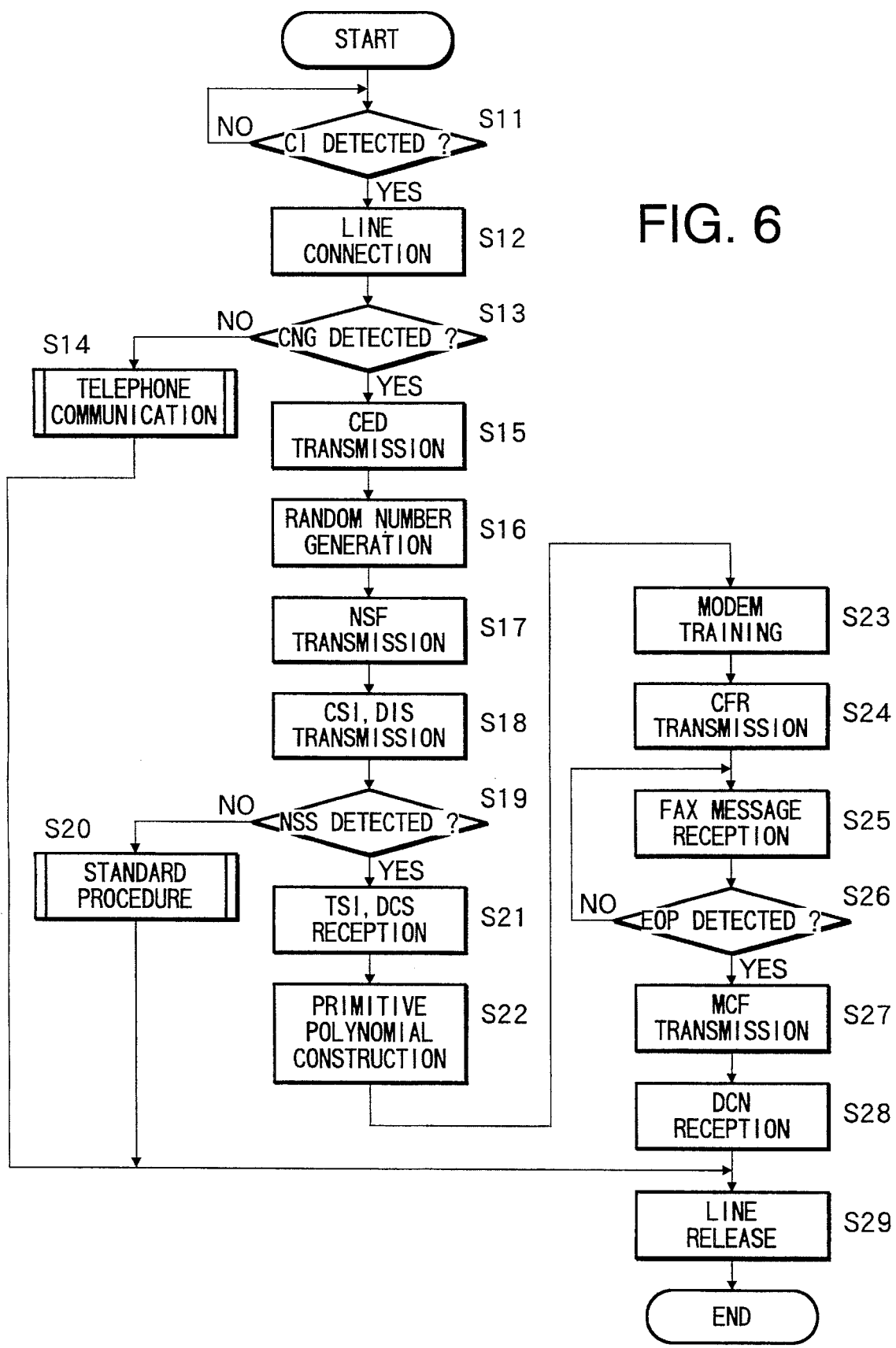
FIG. 6 illustrates a flow chart depicting the cipher facsimile communication method of the present invention.

Operation when the above facsimile device 100 is used at the called side is described with reference to FIG. 6.

When the controller 111 detects a ringing signal (CI) from an exchanger (S11), the controller 111 controls the NCU 104 to connect the telephone line L to the modem 103 (S12). Subsequently, if a CNG signal is not detected within a specified time period (S13), the built-in handset 105 is called, and telephone communication is initiated (S14), while if CNG is detected within a specified time period, then a CED signal is transmitted (S15).

A random number that serves as a primitive polynomial number for indicating the primitive polynomial to be used in encryption is generated by a random number generator 110 (S16), and the primitive polynomial number and information for executing cipher communication in accordance with the present invention are transmitted along with NSF signals indicating nonstandard procedure (S17). CSI signals and DIS signals are then transmitted (S18), after which NSS signal detection is performed (S19). If an NSS signal cannot be detected, then the calling station cannot execute cipher communication in accordance with the present invention, and a standard procedure is implemented (S20). If an NSS signal can be detected, then the calling station can execute cipher communication in accordance with the present invention, and TSI and DCS signals are transmitted (S21), after which a primitive polynomial is constructed in the primitive polynomial constructor 24 of the decoding circuit 20 based on the primitive polynomial number (S22).

After the training of the modem (S23) has been completed, a CFR signal is transmitted (S24), and the FAX message is received (S25). The received FAX message is decoded by the decoding circuit 20, after which the image data is decoded by the redundant compression decoding circuit 106, and the result is recorded on recording paper by signal means of the recorder 107. When an EOP signal indicating the end of the communication data is detected (S26), an MCF signal is transmitted (S27). Subsequently, when a DCN signal is received (S28), the NCU 104 is controlled to release the telephone line L (S29).

Figure 7:
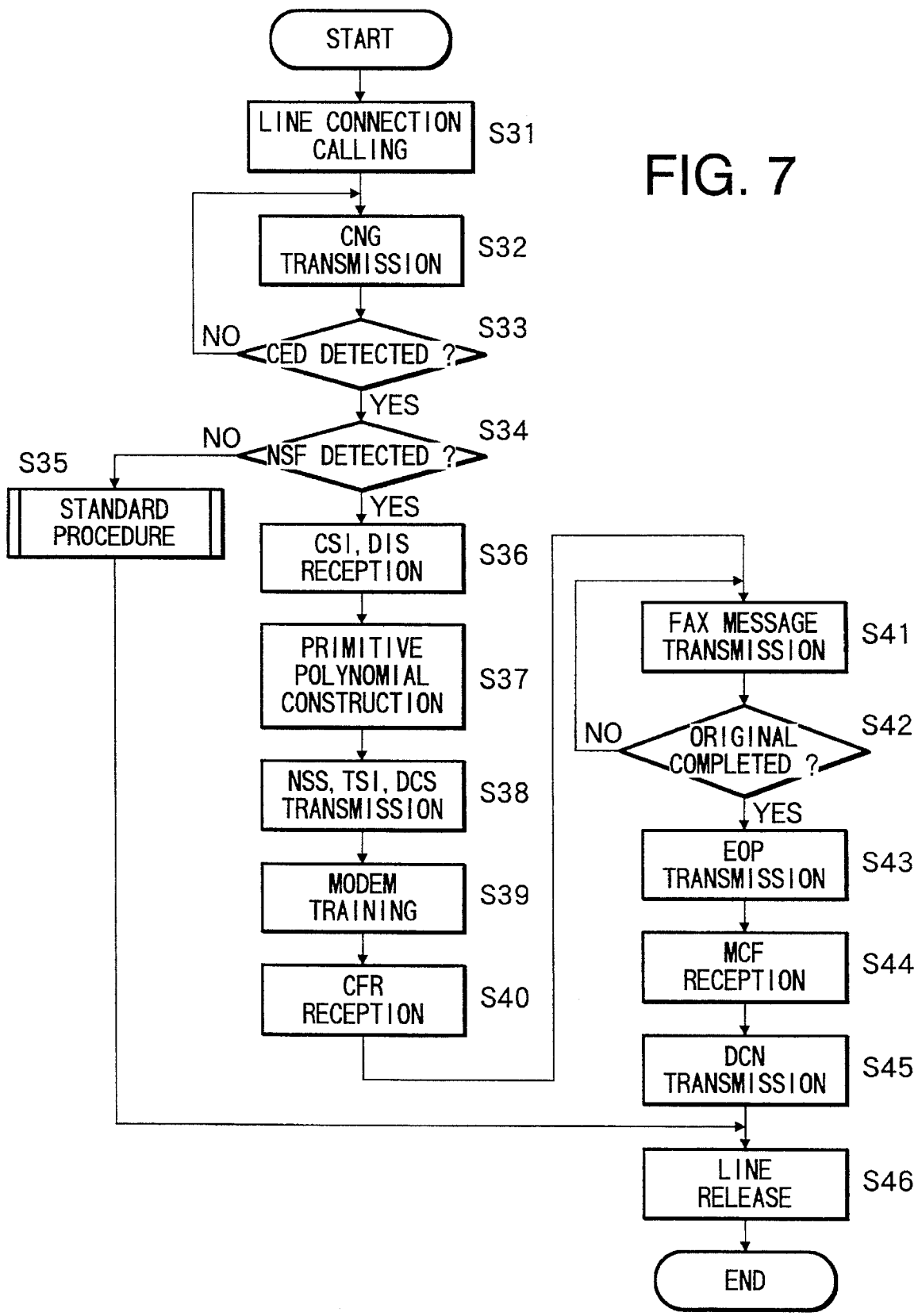
FIG. 7 illustrates another flow chart depicting the cipher facsimile communication method of the present invention.
Figure 8A:
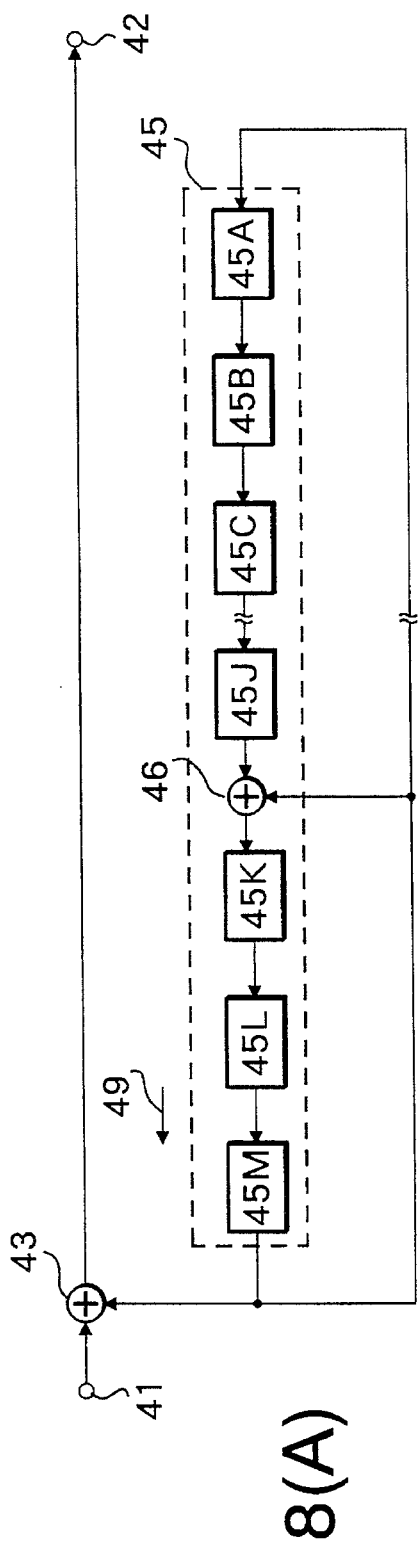
FIG. 8 (a) depicts a conventional encryption circuit.
Figure 8B:
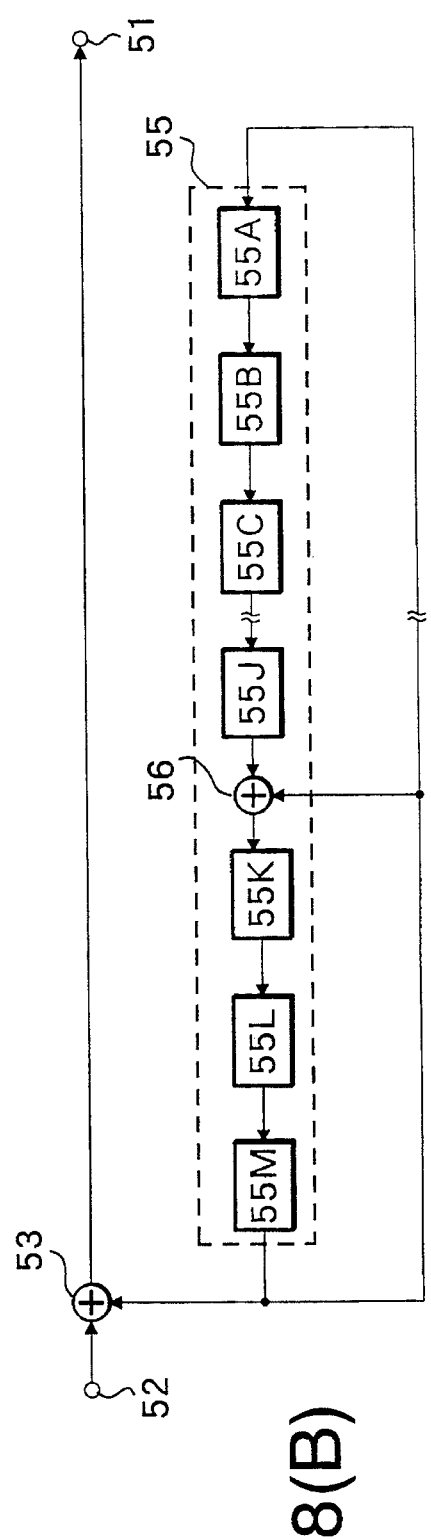

Operation when the above facsimile device 100 is used on the calling side is described below with reference to FIG. 7.

After the user of the facsimile device 100 has placed the original in the scanner 101 and entered the telephone number from the operation key pad 108, when the communication key (not shown in the drawing) is operated, the controller 111 controls the NCU 104 to connect the telephone line L with the modem 103 and transmit a DTMF signal or dial pulse (S31). The controller 111 then executes CED signal detection as the CNG signals are being transmitted (S32, S33).

When a CED signal is detected, the transmission of the CNG signals is suspended, and NSF signal detection is executed (S34). If an NSF signal is not detected (in the case of standard procedure), or if it is detected but does not indicate the cipher communication of the present invention, standard procedure is implemented (S35). If an NSF signal is detected, CSI and DIS signals are received (S36). When information indicating the cipher communication of the present invention is contained in the NSF signals, the primitive polynomial number indicating the primitive polynomial to be used in encryption is detected, and a primitive polynomial is constructed in the encryption circuit 10 (S37).

DCS signals, TSI signals, and NSS signals containing information indicating the capability for the cipher communication of the present invention are then transmitted (S38). When the training of the modem 103 is executed (S39), and the CFR signals are received (S40), a FAX message is transmitted (S41). The scanner 101 sequentially scans the loaded original, converts it into digital image data, and outputs it to the redundant compression coding circuit 102. The redundant compression coding circuit 102 executes compression coding by means of MH or the like, and outputs the result to the encryption circuit 10.

The encryption circuit 10 effects encryption by means of the primitive polynomial constructed by the primitive polynomial constructor 14, after which the FAX message is sent to the modem 103. The modem 103 modulates the FAX message and sends it to the telephone line L. When the transmission of the original has been completed (S42), an EOP signal is transmitted (S43). When an MCF signal is received (S44), a DCN signal is transmitted (S45), and the NCU 104 is controlled to release the telephone line L (S46).

To select the primitive polynomial used in encryption with the above facsimile device 100, a primitive polynomial number is selected by means of a random number at the called side, and this primitive polynomial number is transmitted to the calling side. The selection of the primitive polynomial can also be effected as described below.

(1) A primitive polynomial number is selected by means of a random number by the calling facsimile device, and this is then transmitted to the called side.

(2) Since the facsimile device 100 is equipped with an buildt-in handset 105, the user may telephone the user of the partner facsimile device using the buildt-in handset 105, select a primitive polynomial number for use in encryption, and the primitive polynomial number is then input from each of the operation key pad 108. The facsimile devices 100 on both the calling side and the called side construct the primitive polynomial based on the primitive polynomial number that has been selected via the operation key pad 108, and then effect cipher communication.

(3) The CSI and TSI signals that are the facsimile procedure signals each contain the telephone numbers of the called and calling facsimile devices. Both the calling and called facsimile devices 100 utilize the telephone numbers contained in one or both of the CSI and TSI signals, along with a specified calculation formula,! to select a primitive polynomial, construct a primitive polynomial, and execute cipher communication. If the calculation formula is secret, dual encryption is possible.

(4) When a coding circuit 30 is used, it is necessary to select a plurality of primitive polynomials, but it is also possible to use this method in combination with the method described above.

We claim:

1. A method of cipher communication between a sending station for encrypting communication information and a receiving station for decrypting communication information, the method comprising:

equipping the sending station and the receiving station with a plurality of irreducible polynomials, selecting at least one irreducible polynomial from among the plurality of irreducible polynomials, the step of selecting at least one irreducible polynomial being performed by at least one of the sending station and the receiving station, using the selected irreducible polynomial to perform a self-synchronizing encryption of communication information at the sending station, and using the selected irreducible polynomial to perform a self-synchronizing decryption of communication information at the receiving station.

2. The method of claim 1, wherein communication procedure signals are established between the sending station and the receiving station, and wherein information relating to the selected irreducible polynomial is transmitted to at least one of the receiving station and the sending station in accordance with the communication procedure signals.

3. The method of claim 1, wherein the irreducible polynomial comprises a primitive polynomial.

4. The method of claim 1, wherein at least one of the sending station and the receiving station is provided with a telephone number and a specified calculation formula is provided for selecting a primitive polynomial number, constructing a primitive polynomial, and executing cipher communication.

5. A cipher communication device, comprising:

memory means for storing a plurality of irreducible polynomials, selection means for selecting at least one irreducible polynomial from among the plurality of irreducible polynomials stored in the memory means, construction means for constructing at least one desired irreducible polynomial in response to the selected irreducible polynomial, and encryption/decryption means for using the desired irreducible polynomial to perform at least one of a self-synchronizing encryption of communication information and a self-synchronizing decryption of communication information.

6. The device of claim 5, wherein the selection means comprises means for selecting the at least one irreducible polynomial in response to randomly generated numbers.

7. The device of claim 5, comprising:

communication procedure signal sending means for transmitting information relating to the selected irreducible polynomial in accordance with a communication procedure signal.

8. The device of claim 5, comprising:

communication procedure signal receiving means for receiving information in accordance with a communication procedure signal, the selection means being responsive to the communication procedure signal receiving means for selecting the at least one irreducible polynomial in response to information received by the communication procedure signal receiving means.

9. The device of claim 5, wherein the irreducible polynomial comprises a primitive polynomial.

* * * * *